United States Patent [19]

Chutjian

[11] Patent Number: 4,600,840
[45] Date of Patent: Jul. 15, 1986

[54] DOUBLE PHOTON EXCITATION OF HIGH-RYDBERG ATOMS AS A LONG-LIVED SUBMILLIMETER DETECTOR

[75] Inventor: Ara N. Chutjian, LaCrescenta, Calif.

[73] Assignee: The United States of America as represented by the Administrator, National Aeronautics and Space Administration, Washington, D.C.

[21] Appl. No.: 703,847

[22] Filed: Feb. 21, 1985

[51] Int. Cl.[4] .............................................. G01J 5/36
[52] U.S. Cl. ................................ 250/338; 250/336.1; 250/340
[58] Field of Search ............... 250/338 R, 336.1, 340, 250/423 P; 356/318

[56] References Cited

U.S. PATENT DOCUMENTS 3,764,807 10/1973 Pollack ................................ 250/330
3,914,618 10/1975 Harris ................................. 307/425
4,024,395 5/1977 Hill et al. ........................... 250/338
4,293,769 10/1981 Kleppner ......................... 250/338 R

FOREIGN PATENT DOCUMENTS 2066460 7/1981 United Kingdom ............ 250/338 R

Primary Examiner—Janice A. Howell
Assistant Examiner—Constantine Hannaher
Attorney, Agent, or Firm—Paul F. McCaul; John R. Manning; Thomas H. Jones

[57] ABSTRACT

A method and apparatus for detecting submillimeter or IR radiation is disclosed. A rare gas, such as xenon, is supplied at its ground state via a pressurized cylinder and an adjustable leak valve into a cryogenically-cooled detection area. The ground state of xenon is double-photon excited to a particularized level of the Rydberg series by a resonance lamp and a laser. The doubly-excited gas is then further excited by the radiation to be measured. A field ionization and an ion measurement indicative of the radiation intensity is achieved.

13 Claims, 4 Drawing Figures

DOUBLE PHOTON EXCITATION OF HIGH-RYDBERG ATOMS AS A LONG-LIVED SUBMILLIMETER DETECTOR

BACKGROUND OF THE INVENTION

1. ORIGIN OF THE INVENTION

The invention described herein was made in the performance of work under a NASA Contract and is subject to the provisions of Section 305 of the National Aeronautics and Space Act of 1958, Public Law 85-568 (72 STAT 435; 43 USC 2457).

2. FIELD OF THE INVENTION

This invention relates to a method and apparatus for detecting submillimeter photons emitted from a variety of sources such as, for example, astronomical objects, missiles, satellites, planets, stars, etc. Ground sources such as cities, factories, power plants, missile launch sites and the like may also be analyzed by my invention.

Rare gas atoms are subjected to double photon excitation to form an atomic detector. The double photon excitation occurs via use of a long-lived resonance lamp for the first excitation, followed by use of a tunable laser for the second excitation. The rare gas may be, for example, xenon which is excited from its ground state to an np member of a high-Rydberg ("HR") series. The submillimeter radiation consists of photons emitted from any of the above-noted sources. The photons are collected and cause a third step of excitation of the np member of the Rydberg series to a higher $(n+1)d$ level. An electric field impressed across the HR atom creates a field-ionized ion from the $(n+1)d$ level. The intensity of the field-ionized $Xe^+$ ions is measured by any well-known ion detector, such as a microchannel plate array. The signal intensity of the field-ionized ions is proportional to the incident submillimeter radiation intensity.

3. BACKGROUND DISCUSSION

Use of HR atoms as submillimeter detectors is known. For example, U.S. Pat. No. 4,024,396 to Hill et al. discloses a known technique in which an atomic source utilizes an oven or heat-pipe to generate a vapor beam of sodium, potassium, cesium or similar metal atoms. The initial transition of the atoms in vapor state to a high-lying member of a Rydberg series is achieved by laser excitation. The incident radiation in Hill et al. causes an up-conversion in frequency of the low-lying Rydberg atoms, and that conversion causes photons to be emitted. The emitted photons are of much higher energy. Their intensity is detected and used as a measure of the strength of the incident submillimeter radiation.

When contemplated for use in satellites for infrared radiation ("IR") astronomy, or for the detection of terrestrial IR, ground source IR, or other submillimeter sources, the Hill et al. approach is unsatisfactory. When considered as a payload in a spacecraft, the metal atoms of Hill et al. and similar prior art are potentially dangerous. A resistively heated or heat-pipe oven is subject to clogging, intensity variations and has a relatively short-lived operational span. Photon detection by up-conversion is not as highly sensitive or as accurate as the ion detection afforded by my invention.

Another approach known in the art is discussed in U.S. Pat. Nos. 3,764,807 and 3,914,618, issued respectively to Pollack and Harris. In these and comparable systems, the atoms absorb the infrared radiation to be detected and go from a ground state to an intermediate state. Lasers are employed to create an up-conversion to emissions that may be studied visually. Such devices suffer from lack of tunability and are not exemplative of the field of use or technical approach of my invention.

By way of completeness, my invention also differs from other types of submillimeter detectors such as the bolometer, point-contact Josephson junction and Schottky diode. These devices are not easily tunable and have a broad-band spectral response, not a tunable, high-resolution spectral response as does my device.

SUMMARY OF THE INVENTION

Disclosed in a method and apparatus for a submillimeter detector that employs inert rare gas atoms. The rare gas is supplied by a pressurized cylinder. Such a source produces a steady flow through an adjustable leak valve without fear of clogging or intensity variations. The leak valve will control the flow rate of gas that is admitted into the detector area. Such a control is necessary to limit the pressure in the detector region. Excessive pressure would lead to arcing in the ion detector or would create secondary effects, such as collisional quenching of the excited states involved or lead to ion-atom reactions.

My invention makes use of a double photon excitation process. The flow of rate gas is first subjected to a comparable wavelength rare-gas resonance lamp to excite the gas from its ground state to an intermediate state. Next a tunable laser is employed to further excite the rare gas into an np HR series. Infrared or submillimeter photons from a variety of sources to be studied are admitted into the detector. These photons excite the combined resonance lamp and laser-excited np state to a higher $(n+1)d$ level. The absorption of the IR or submillimeter radiation occurs in an electric field of a proper strength to ionize the finally-excited rare gas. Rare gas ions are detected by any well-known ion detection circuitry to obtain an output signal that is proportional to the incident radiation intensity.

DETAILED DESCRIPTION OF THE DRAWINGS

Figure 1:
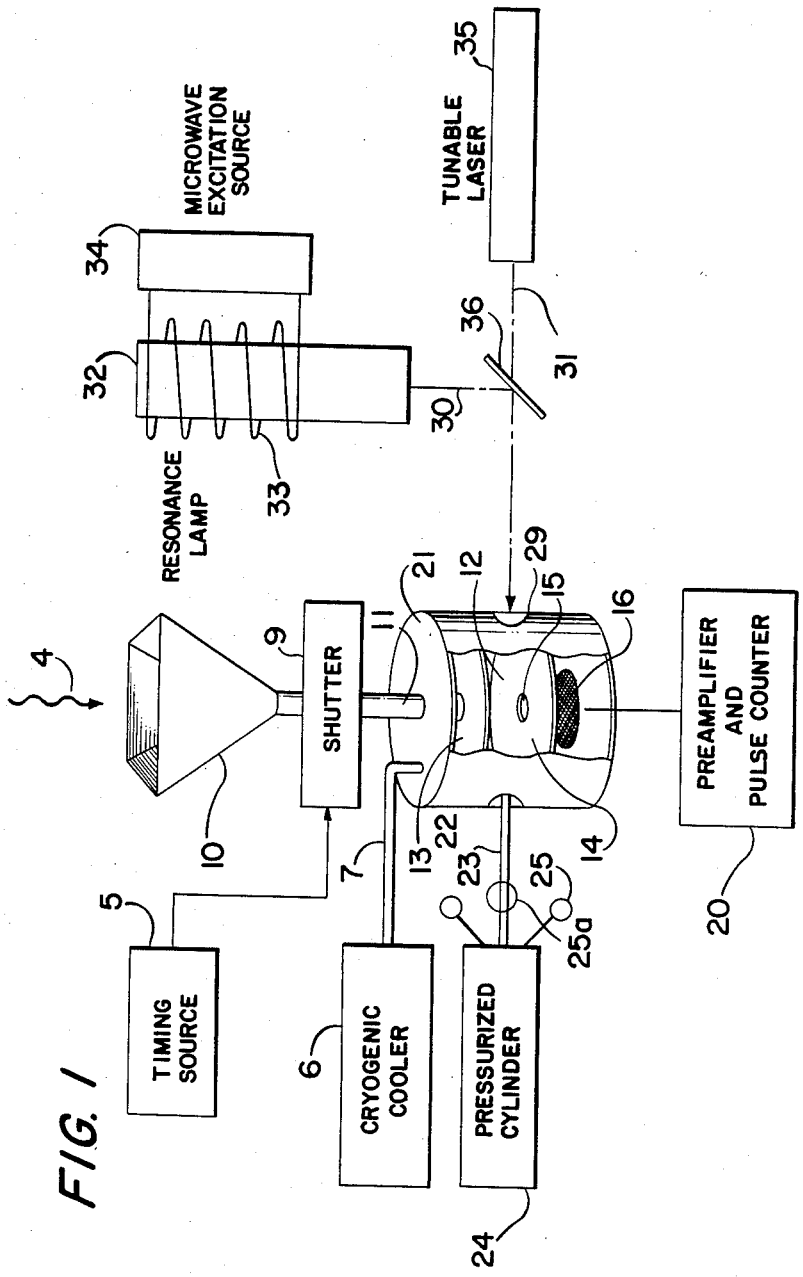
FIG. 1 is a schematic drawing partially in cutaway perspective of the elements forming the IR or submillimeter detector of my invention.

FIG. 1 depicts the detector apparatus of my invention wherein IR or submillimeter radiation 4 from any source to be studied is collected by any suitable antenna such as a large solid angle collection horn 10. Once collected, the radiation is focused by a pipe 11 into a chamber 12 in which two electric field plates 13 and 14 are centrally placed. A conventional shutter 9 is used to admit IR or submillimeter radiation to chamber 12 when the shutter 9 is open.

When a given amount of radiation is admitted (after a predetermined time) into chamber 12, shutter 9 thereafter remains closed until the measurement is completed. A typical cycle measurement time would be about 1 millisecond. The cyle is repeated as often as is necessary. A conventional timing source 5 controls the opening and closing of shutter 9.

Each one of field plates 13 and 14 have coaxially-located openings. The opening in top plate 13 allows passage of the IR or submillimeter radiation 4 into chamber 12. The other opening, 15, in plate 14 is positioned above a microchannel plate ion detector 16, shown representatively by the cross-hatched gridwork. This opening 15 allows passage of ionized rare gas atoms to the ion detector 16. Ion detector 16 may be any wellknown detector conventionally known to this art. The ion detector 16 emits a single to any conventional preamplification and pulse counting circuitry 20 that is also well known in the art.

A housing 21 surrounds the plates, which housing, along with the collection horn, is cryogenically cooled by conventional cryogenic cooler 6. Although shown only symbolically by a connection line 7 to the top of housing 21, it is well known in this art that, as in other types of IR detectors, the entire housing 21 and horn 10 must be cryogenically cooled. Such cryogenic cooling minimizes interference which would otherwise be caused by well-known black-body radiation from the inner walls of the housing 21 and horn 10.

Housing 21 has three axes which intersect to define the area of detector activity. Opening 22 is fed a steady flow of a rare inert gas that can be selected from xenon, krypton, argon or neon, as nonlimiting examples. For ease of explanation, xenon will be used in further describing my invention. My invention, however, is not limited to xenon, as any of the other rare gases will work equally as well.

Xenon gas is supplied by pipe 23 from the pressurized cylinder 24. Valve 25 supplies readings for monitoring the gas pressure in cylinder 24. For spacecraft use, the cylinder's volume shall be suitably pressurized to meet a specific finite lifetime. Valve 25a controls the rate of gas flow into chamber 12. When first released from the cylinder 24, the gas is in its normal or ground state.

Located in a position opposed to opening 22 is another opening 29 which admits into chamber 12 a resonance lamp beam and a laser beam. Both beams 30 and 31 are employed to create a double photon excitation of the xenon gas after it has been introduced into chamber 12.

Since xenon is being discussed as a preferred embodiment, the resonance lamp 32 would be any wellknown xenon resonance lamp. If a different gas is used, the resonant lamp wavelength must match the absorption wavelength of the other gas. Such resonant lamps rely on microwave excitation, as supplied by microwave source 34 via an excitation coil 33, to emit a beam 30 of photons. The lamp 32 excites the xenon gas in chamber 12 into an intermediate state, as will be described in more detail hereinafter.

Mirror 36 transmits a laser beam 31 from a tunable laser 35 into opening 29. Beam 31 is coaxially aligned with beam 30 from resonance lamp 32 which is reflected by mirror 36. The laser beam 31 is employed to further excite the resonance-lamp-excited xenon gas to a particular level of an HR series, as will be more fully described hereinafter with respect to FIGS. 2 and 3.

Figure 2:
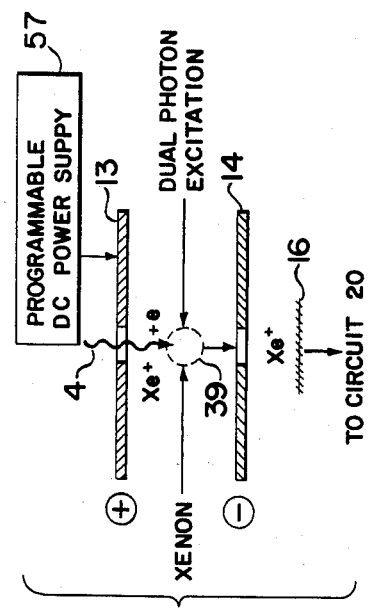
FIG. 2 is a simplified view of the rare gas being excited.

Impressed across plates 13 and 14, as shown in FIG. 2, is an electric field chosen with sufficient electrical field potential to ionize the excited xenon gas from its excited np or (n+1)d Rydberg levels. FIG. 2 shows a cross-sectional view of plates 13 and 14 wherein the detector activity is shown symbolically as a dashed circle 39. The xenon gas from pressurized source 34 is double photon excited to an HR series, such as the np series. Atoms in the np level are then further excited to an (n+1)d Rydberg level by absorption of the IR or submillimeter radiation 4. The electric field is then swept from its zero value through a value necessary to ionize atoms in the (n+1)d level.

Field-ionized electrons from the IR or submillimeter radiation-excited atoms are collected on the upper positively charged plate 13, while the positive field-ionized (n+1)d ions are extracted through opening 15 (FIG. 1). The ions are collected by the ion microchannel plate detector 16. A signal from 16 is processed in a well-known manner by any suitable preamplifying and counter circuit 20. Counter circuit 20 supplies an output reading which indicates the intensity of detected $Xe^+$ ions (FIG. 2) as a function of the swept electric field. This ion intensity is in turn proportional to the intensity of the (np)→(n+1)d excitation; i.e., to the intensity and wavelength of the IR or submillimeter radiation 4.

OPERATION OF INERT GAS EXCITATION

Figure 3:
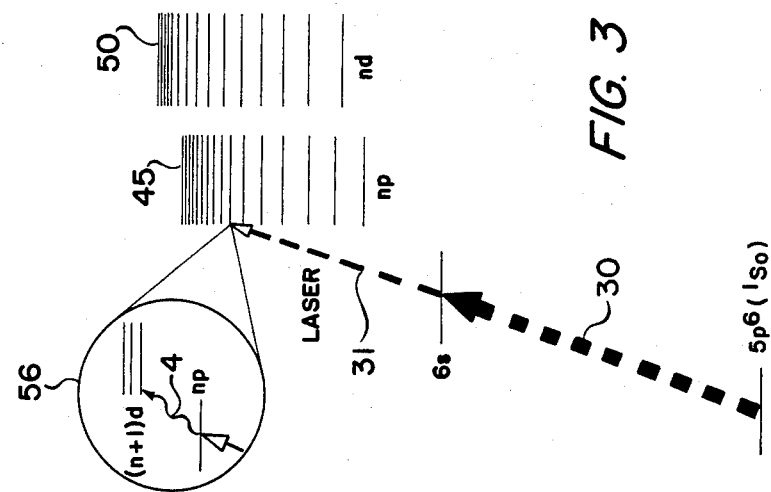
FIG. 3 is a highly schematic presentation of double-photon excitation, including an enlarged view of infrared or submillimeter excitation to a final absorption level.

Turning now to FIG. 3, a schematic energy level structure and excitation sequence of xenon gas is shown. Xenon gas is initially in the ground electronic state, which is shown in FIG. 3 as the $5p^6(^1S_o)$ state. The resonance lamp beam 30 (shown as a heavy dashed arrow) emits a photon which excites xenon from its ground state to an intermediate, or 6s, state as depicted at the arrowhead of beam 30. It should be noted that this step of the double-photon excitation apparatus and method of my invention is fixed by the selection of the wavelength and intensity output from the xenon resonance lamp 32 (FIG. 1).

The next step of the excitation process is a variable step which adds versatility in the practice of my invention. For example, I have two different ways of varying the frequency of absorption of the IR or submillimeter photons to be detected. As a background to understanding the variable absorption, the HR series of FIG. 3 will be described. Two different Rydberg series are depicted in FIG. 3; namely, the np series 45 and the nd series 50. The spacing in either series represents the energy required to move from one level within a series to another level. The np series 45 in my example starts with n equal to 6, and it may go to any whole number up to infinity. Of course, in the limit of infinity, the xenon in that np series will reach its ionization limit and the electrons will simply drift away. The energy required to cause excitation to a next higher level varies within a series or from series to series. The required energy decreases as higher values of n are involved. I have depicted the higher levels as being closer and closer together.

My laser beam 31 is generated by a conventional tunable laser 35, FIG. 1. By simply varying the wavelength output from laser 35, I can change the upper np state to any valve of n which is desirable. As a nonlimiting example, assume that my laser 35 is variable between a range of about 350 nm to about 400 nm. If the laser 35 is emitting 370 nm, then the "6s→np" step would achieve excitation to 30$p$.

Assume further that the 30p is the enlarged section shown within circle 56. Since absorption of photons from the IR or submillimeter radiation 4 will only occur when the incoming energy equals the difference in energy between the 30p and the 31d state, I have achieved one variable by the selection of a value of n, depending upon the tuned wavelength output from my laser 35.

Returning now to FIG. 2, briefly, another manner of varying the sensitivity of the detector is by use of what is known in the art as stark-shifting of the (n+1)d states. Such stark-shifting requires a variable bias voltage 57 as supplied through any programmable direct current power supply 57. Bias voltage 57 is chosen to be less than that needed to field-ionize the atom. Variation of that bias will shift the (n+1)d level from one position in that (n+1)d series to some other level. It will thereby cause a relative change in energy difference of the np→(n+1)d transition. To use my earlier example, if n is chosen as 30, then I will have stark-shifted the 31d level relative to the 30p. It will now take a different amount of photon energy to be absorbed from the incoming radiation 4 to excite that higher 31d level.

As another example, it is clear that if n was chosen to be near 10, then the position in the series is lower, and to go from levels of 10p to 11d would be a larger energy step than was true for my earlier example with higher n values, wherein the energy spacing is smaller. Thus, initial excitation to n near 10 corresponds to detection of shorter wavelength photons than to excitation to n near 30.

Figure 4:
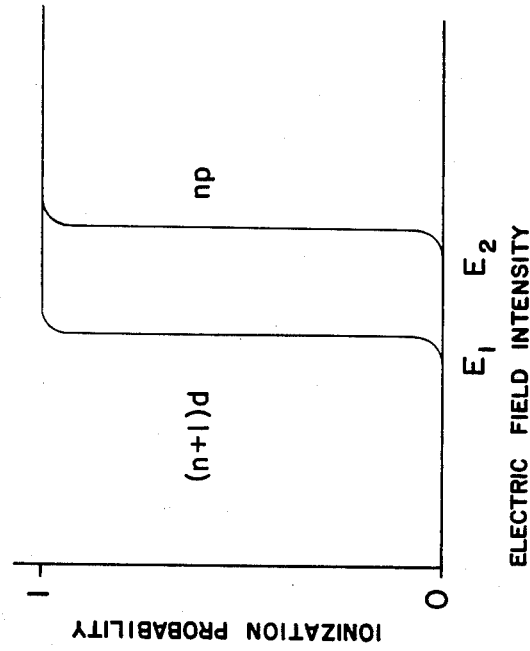
FIG. 4 is a graph depicting the selective field ionization as used in my invention.

In FIG. 4 we show a typical response of a submillimeter-excited xenon atom to the field-ionizing electric field. The atom has absorbed radiation, exciting it to the higher (n+1)d level. Since this level is closer to the ionization limit than the np level, a swept field-ionizing electric field (between plates 13 and 14) will, at field intensity $E_1$, cause the (n+1)d atom to ionize. The intensity of the $Xe^+$ ion detected at the microchannel plate 16 will be proportional to the intensity of submillimeter photons absorbed at the np→(n+1)d transition. This completes the desired detection sequence. At the higher field $E_2$, atoms in the np state which have neither absorbed radiation nor have radiatively decayed to lower states will ionize.

The above description presents the best mode contemplated in carrying out the present invention. This invention is, however, susceptible to modifications and alternate constructions from the embodiments shown in the drawings and described above. Consequently, it is not the intention to limit the invention to the particular embodiments disclosed. On the contrary, the invention is to cover all modifications, sizes and alternate constructions falling within the spirit and scope of the invention as expressed in the appended claims.

What is claimed is:

1. A method of submillimeter detection comprising the steps of:
    metering a quantity of rare gas from a pressurized cylinder into a cryogenically-cooled detection area;
    photon exciting the rare gas atom by first subjecting it to a resonance lamp beam selected from the same rare gas;
    causing a second photon excitation of the excited rare gas atom by subjecting it to a wavelength-tunable laser beam;
    fully exciting the double-photon excited atom, by admitting into the detection area, a source of IR or submillimeter radiation to be measured;
    impressing an ionization electric field across the fully excited atom; and
    detecting the ion created by the field ionization as a measurement of the intensity of the submillimeter or IR irradiation.

2. A method in accordance with claim 1 wherein said metering step further comprises:
    adjustably opening a leak valve located in the gas supply means between the pressurized cylinder and said detection area.

3. A method in accordance with claim 1 and comprising the additional step of:
    pressurizing a desired amount of rare gas in a pressurized container.

4. A method in accordance with claim 1 and comprising the additional step of:
    selecting the rare gas from the family including xenon, krypton, argon or neon.

5. A method in accordance with claim 1 wherein the supplying step further comprises the step of:
    releasing the rare gas in its ground state into said detection area.

6. A method in accordance with claim 5 wherein said photon-exciting state further comprises the step of:
    exciting the rare gas from its ground state to an intermediate state.

7. A method in accordance with claim 6 wherein said second photon excitation step further comprises the step of:
    further exciting said intermediate state to a particularized level of an np or nd Rydberg series.

8. A method in accordance with claim 6 wherein said electric field-applying step further comprises the step of:
    selecting the field strength to ionize the excited np or nd Rydberg level.

9. A sumbillimeter detector comprising:
    a pressurized cylinder containing a predetermined quantitiy of a rare gas such as xenon;
    means for supplying a quantity of rare gas into a cryogenically-cooled detection area;
    resonance lamp means for photonexciting the rare gas atom by subjecting it to a beam selected from the same rare gas;
    a wavelength-tunable laser means for further photonexciting the first excited rare gas atom;
    means admitting into the doublephoton-excited atom area a source of IR or submillimeter radiation to be measured for fully exciting the rare gas atom;
    means for applying an ionization electric field across the excited atom; and
    detecting means responsive to the ion created by the field ionization for measuring the intensity of said radiation.

10. A submillimeter detector in accordance with claim 9 wherein said supplying means further comprises:
    an adjustable leak valve connected between said pressurized cylinder and said detection area.

11. A submillimeter detector in accordance with claim 10 wherein said admitting means comprises:
    means for collecting submillimeter or IR radiation to be measured; and a selectively operable shutter means connected between said collecting means and said detection area.

12. A submillimeter detector in accordance with claim 9 wherein said lamp and laser means are further characterized by:

coaxially directing their respective beams into said detection area.

13. A submillimeter detector in accordance with claim 12 and further characterized by:

said supplying means comprising a valved source of rare gas directed along an axis which intersects said coaxiallydirected beams.

* * * * *